United States Patent [19]

Yagasaki et al.

[11] Patent Number: 4,632,448
[45] Date of Patent: Dec. 30, 1986

[54] LIGHT MOTOR VEHICLES

[75] Inventors: Akio Yagasaki, Tokyo; Masaki Watanabe, Saitama, both of Japan

[73] Assignee: Honda Giken Kogyo Kabushiki Kaisha, Tokyo, Japan

[21] Appl. No.: 545,573

[22] Filed: Oct. 26, 1983

[30] Foreign Application Priority Data

Oct. 26, 1982 [JP] Japan .............................. 57-188472
Oct. 26, 1982 [JP] Japan .............................. 57-188473
Oct. 26, 1982 [JP] Japan .............................. 57-188475

[51] Int. Cl.$^4$ ............................................. B62J 17/04
[52] U.S. Cl. .................................... 296/218; 296/102; 296/132; 296/84 R; 296/78.1; 280/289 S
[58] Field of Search .............. 296/102, 103, 107, 108, 296/124, 131, 210, 216, 218, 78.1, 111, 132, 78 R, 84 R, 84 A, 84 D, 84 G, 89, 78 A, 84 N, 120 A; 280/289 S

[56] References Cited

U.S. PATENT DOCUMENTS

| 692,501 | 2/1902 | Bentley | 296/78 A |
|---|---|---|---|
| 1,445,064 | 2/1923 | Belluomini et al. | 296/120 A X |
| 2,967,073 | 1/1961 | Gagliardi | 296/84 R |
| 3,083,994 | 4/1963 | Domina | 296/107 |
| 3,829,152 | 8/1974 | Hobbs | 296/78 R |
| 4,066,291 | 1/1978 | Hickman | 296/78.1 |
| 4,120,529 | 10/1978 | Chrysler | 296/218 |
| 4,336,964 | 6/1982 | Pivar | 296/78.1 X |
| 4,353,590 | 10/1982 | Wei-Chuan | 296/78.1 |
| 4,372,602 | 2/1983 | Tsuchiya et al. | 296/78 R |
| 4,440,436 | 1/1984 | Giddens et al. | 296/78.1 X |

FOREIGN PATENT DOCUMENTS

| 1077549 | 3/1960 | Fed. Rep. of Germany | 296/78.1 |
|---|---|---|---|
| 2384641 | 11/1978 | France | 296/216 |
| 138483 | 2/1920 | United Kingdom | 296/84 R |

Primary Examiner—Robert B. Reeves
Assistant Examiner—Russell D. Stormer
Attorney, Agent, or Firm—Armstrong, Nikaido, Marmelstein & Kubovcik

[57] ABSTRACT

A light motor vehicle comprising a wind shield disposed in front of a driver's seat, a roof stay standing behind the driver's seat, a set of fittings for defining a cabin, the fittings including a roof member attachable to and detachable from between the upper end of the wind shield and the upper end of the roof stay, and an accommodation space for accommodating the fittings.

15 Claims, 29 Drawing Figures

LIGHT MOTOR VEHICLES

BACKGROUND OF THE INVENTION

1. Field of the Invenion

The present invention relates to a light motor vehicle equipped with a pair, a triple or a quartet of road wheels, particularly of the type which is open in itself about the driver.

2. Description

Conventionally, there have been made attempts at, in a two-, three or four wheeled light motor vehicle open in itself about the driver, forming a cabin with fittings including a roof thereby to provide a weather-proofness.

In such conventional attempts, however, there have been provided no considerations such as for the easiness in the attachment of such fittings to and the detachment thereof from a vehicle body as well as for the space for accommodating the fittings as removed.

As a result, those vehicles with such attempts undertaken have fallen in short of the readiness to attach such fittings to the vehicle body as circumstances require such as in rainy weather and to detach them therefrom when unnecessary.

The present invention has been achieved to ravel out such conventional inconvenience.

SUMMARY OF THE INVENTION

According to the present invention, there is provided a light motor vehicle comprising a vehicle body, a driver's seat arranged on the vehicle body, a wind shield disposed in front of the driver's seat, a roof stay standing behind the driver's seat, a set of fittings for defining a cabin, the fittings including at least a roof member attachable to and detachable from between the upper end of the wind shield and the upper end of the roof stay, and an accommodation space for accommodating the fittings.

Accordingly, an object of the present invention is to provide a light motor vehicle which readily permits the attachment as well as the detachment of fittings for defining a cabin, while having a consideration provided for the accommodation of such fittings.

The above and further features, objects and advantages of the present invention will more fully appear from the following detailed description of the preferred embodiments of the invention when the same is read in conjunction with the accompanying drawings.

DETAILED DESCRIPTION OF THE INVENTION

Figure 1:
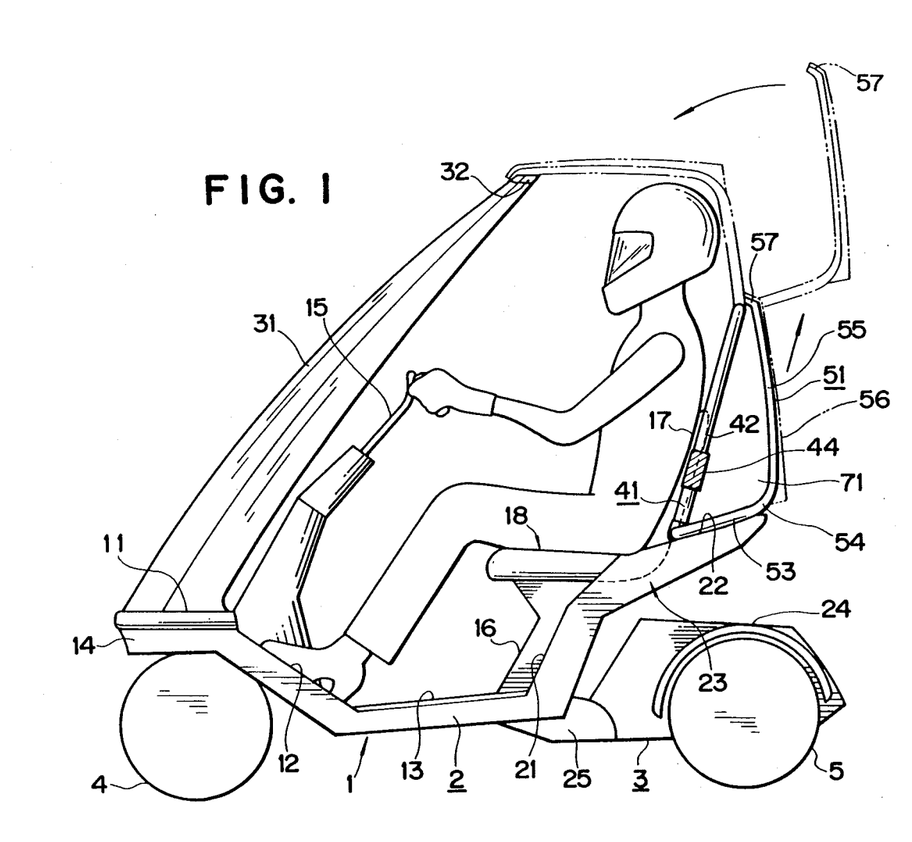
FIG. 1 is a side view of a tricycle according to a first embodiment of the invention.

Referring first to FIGS. 1 to 4, with particular reference to FIG. 1, generally designated at reference character 1 is a motor tricycle according to a first embodiment of the invention. The tricycle 1 has a front vehicle body 2 provided with a front wheel 4 as a single dirigible road wheel at the front end thereof and a rear vehicle body 3 provided with a pair of rear wheels 5 as a pair of drive road wheels in the rear part thereof, the rear wheels 5 being driven by a power unit (not shown) installed under a cover 24. The rear vehicle body 3 is suspended from the front vehicle body 2 through a shock absorber (not shown) and connected at the front end thereto through a swingable joint 25 permitting a relative rolling motion therebetween.

The front vehicle body 2 is formed with a front floor 11 disposed above the front wheel 4, a sloping floor 12 sloping down rearwardly from the rear end of the front floor 11 and a flat foot-rest floor 13 extending, at a relatively low level, rearwardly from the lower end of the sloping floor 12. The front floor 11 has a front fender 14 formed along the front lower edge thereof, and the sloping floor 12 has a rearwardly inclined steering column standing thereon and coaxially holding at the top a steering handle 15. At the rear end of the foot-rest floor 13, there is standing a rearwardly inclined seat post (not shown) surrounded by a cover 16 with a maximum transverse width dimensioned smaller than the width of the foot-rest floor 13. The seat post has a driver's seat 18 formed at the top thereof and provided with a seat back 17. Moreover, at the rear end of the foot-rest floor 13, the front vehicle body 2 is integrally provided with a rear cover 23 under which the rear vehicle body 3 is disposed, the rear cover 23 consisting of an ascending portion 21 rearwardly ascending along both sides of the seat post cover 16 and an extending portion 22 extending therefrom further rearwardly with a slightly upward slant.

On the front floor 11, standing upwardly from the front edge and both side edges thereof is a wind shield 31 curvilinearly slanting rearwardly, the wind shield 31 being provided with a top lace 32 fitted along the upper edge thereof.

On the extending portion 22 of the rear cover 23, there is standing a roof stay 41 slanting rearwardly as seen from FIGS. 1 to 4. The roof stay 41 consists of left and right guide portions 42, 42 extending upwardly from the upper surface of the extending portion 22 alongside of the seat back 17 and a bridge portion 43 interconnecting the upper ends of the guide portions 42, 42. The upper ends of the guide portions 42, 42 as well as the bridge portion 43 are positioned at a slightly higher level than the shoulder of a driver, as sitting on the driver's seat 18, who has a standard height. The guide portions 42, 42 have either of a pair of grips 44 fitted thereon by rubber-baking at suitable positions for the driver's convenience such as when getting in and out of the tricycle 1 as well as when wheeling it by hands.

Figure 5:
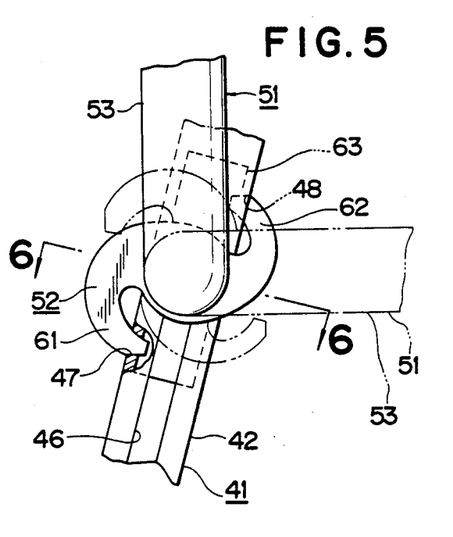
FIG. 5 is an elarged side view for showing the engagement of essential parts of a roof stay and a roof-supporting arm of the tricycle of FIG. 1.
Figure 6:
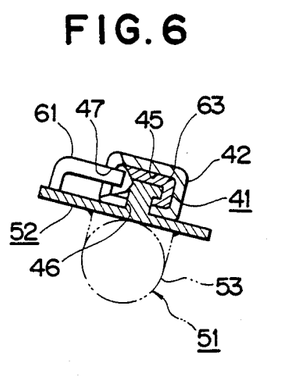
FIG. 6 is a cross sectional view taken along line "6"—"6" of FIG. 5.

Referring now to FIGS. 5 and 6, the left and right guide portions 42, 42 are opposingly flanged to be channeled, in cross section, to form each therein a guide slot 45, in which a slide piece 63 is slidably fitted, opening through a slit 46 opposite to the other. Moreover, each of the guide portions 42, 42 has in the vicinity of the upper end thereof lower and upper engagement holes 47, 48 cut in the front and rear flanged parts thereof, respectively, and spaced therealong from each other.

The guide portions 42, 42 of the roof stay 41 are provided with either of a pair of roof-supporting arms 51, 51 arranged so as to be vertically slidable and pivotable relative to the guide portions 42, 42. Namely, each arm 51 is welded at the proximal end to a rotatable plate 52 pivotably fitted through the slit 46 to the slide piece 63, and bent substantially in the form of a letter L in the side view, thus comprising a support portion 53 and a roof-fixing portion 55 substantially perpendicularly extending therefrom through a bent part 54, as shown in FIG. 1. Between the two fixing portions 55 as located either on the left and right, there is stretched to be fixed thereto a roof 56 which has a pair of locking parts 57 formed at the distal end thereof.

Moreover, as shwon in FIGS. 5 and 6, the rotatable plate 52 is shaped substantially in the form of a letter S in the side view, to provide a pair of engagement pawls 61, 62 arranged symmetrical with respect to the axis of rotation of the plate 52.

Figure 2:
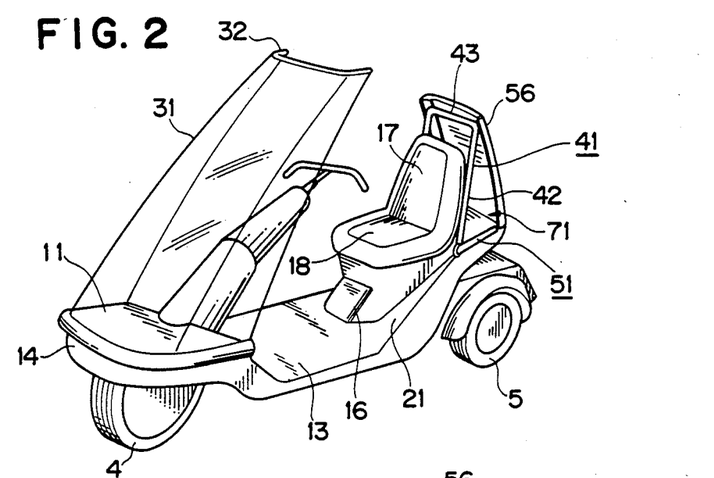
FIG. 2 is a perspective view of the tricycle of FIG. 1, with a roof accommodated in position.
Figure 3:
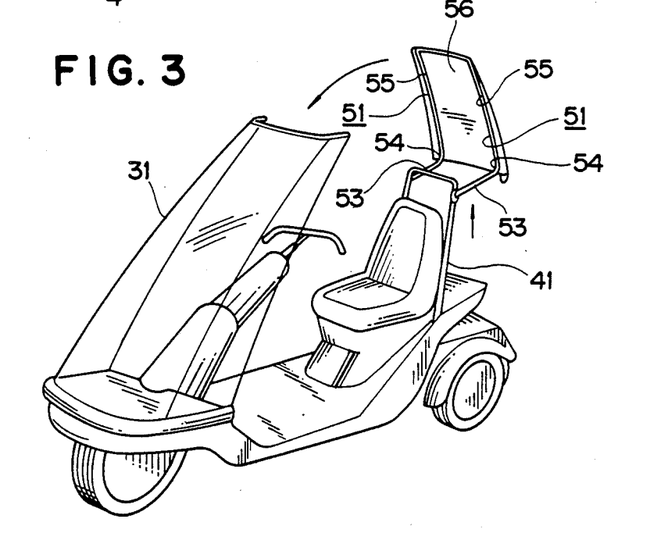
FIG. 3 is a perspective view of the tricycle of FIG. 2, with the roof in a swung position.
Figure 4:
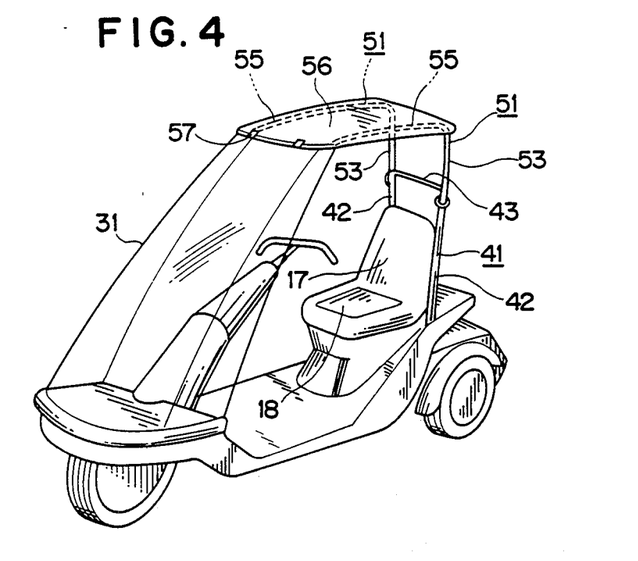
FIG. 4 is a perspective view of the tricycle of FIG. 2, with the roof fitted in position.

In this connection, when the support portion 53 of the roof-supporting arm 51 as inclined rearwardly as shown by the imaginary line in FIG. 5 is slided down along the guide portion 42 to the lower end thereof at each of the left and right of the roof stay 41, as shown in FIGS. 1 and 2, it will be placed on the upper surface of the rear cover 23. Concurrently, the bent part 54 will be brought down to be located at the rear end of rear cover 23, with the roof-fixing portion 55 upwardly extending therefrom, thereby causing the distal end of the roof 56 to be locked on the bridge portion 43 of the roof stay 41. In consequence, the roof 56 will be accommodated behind the seat back 17, thus providing a trunk space 71 defined therebetween above the rear cover 23.

Further, when the arm 51, as slided upwardly from the above state to the upper end of the guide portion 42 of the roof stay 41 into such a state as shown by the imaginary line in FIG. 1, is swung frontwardly, thereby bringing the pawls 61, 62 of the rotatable plate 52 into engagement with the holes 61, 62 of the guide portion 42 and causing the distal end of the roof 56 to be locked with the lace 32 at the top of the wind shield 31, then there will be provided a driver cabin defined by the wind shield 32, the roof 56 and the driver's seat 18, above the front vehicle body 2.

According to the above embodiment of the invention, a pair of roof-supporting arms, which are arranged either vertically slidable and pivotable relative to a pair of guide portions of a roof stay and provided with a roof secured thereto, favorably permits an easy and quick attachment of the roof from above a driver's seat as well as the detachment thereof followed by a convenient accommodation of the roof to be placed behind a seat back of the driver's seat, while concurrently providing a useful trunk space.

Referring now to FIGS. 7 to 16, there will be described hereinbelow a second embodiment of the invention.

Figure 7:
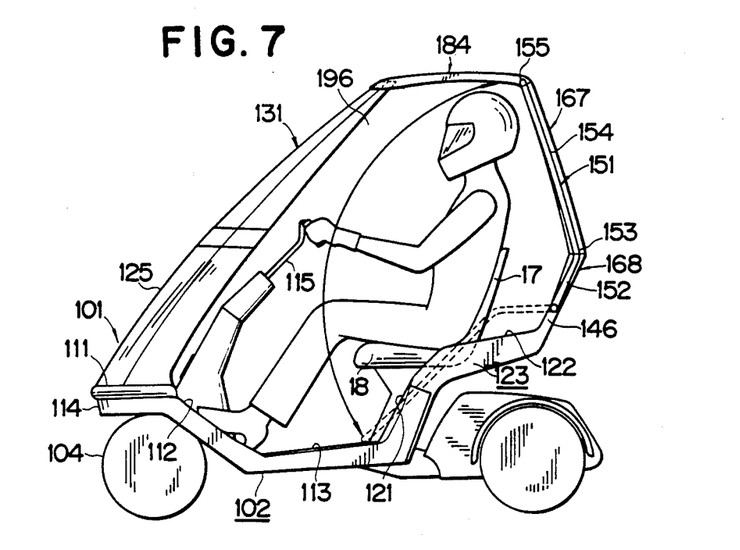
FIG. 7 is a side view of a tricycle, with a driver cabin made up, according to a second embodiment of the invention.

In FIG. 7, generally designated at reference character 101 is a tricycle having a front floor 111 formed in the front end thereof. On the front floor 111, standing upwardly from the front edge and both side edges thereof is a front cover 125 slanting rearwardly, the upper end of which is positioned substantially at the same level as both grips of a steering handle 115, that is, at a slightly higher level than the knees of a driver, as sitting on a driver's seat 118, who has a standard physique.

Figure 8:
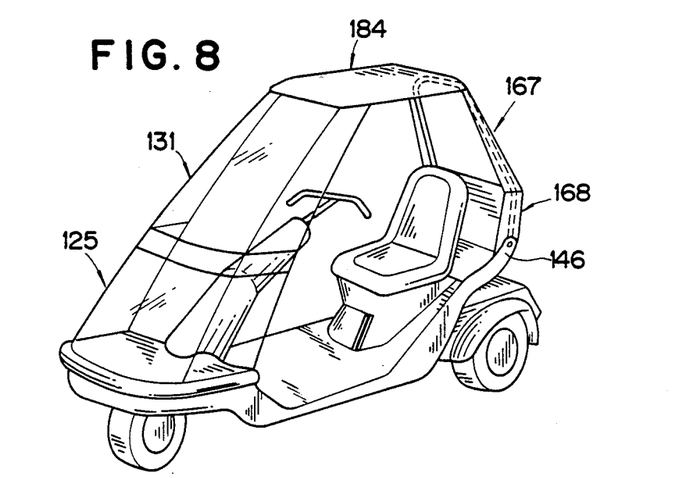
FIG. 8 is a perspective view of the tricycle of FIG. 7.
Figures 10, 11, 12:
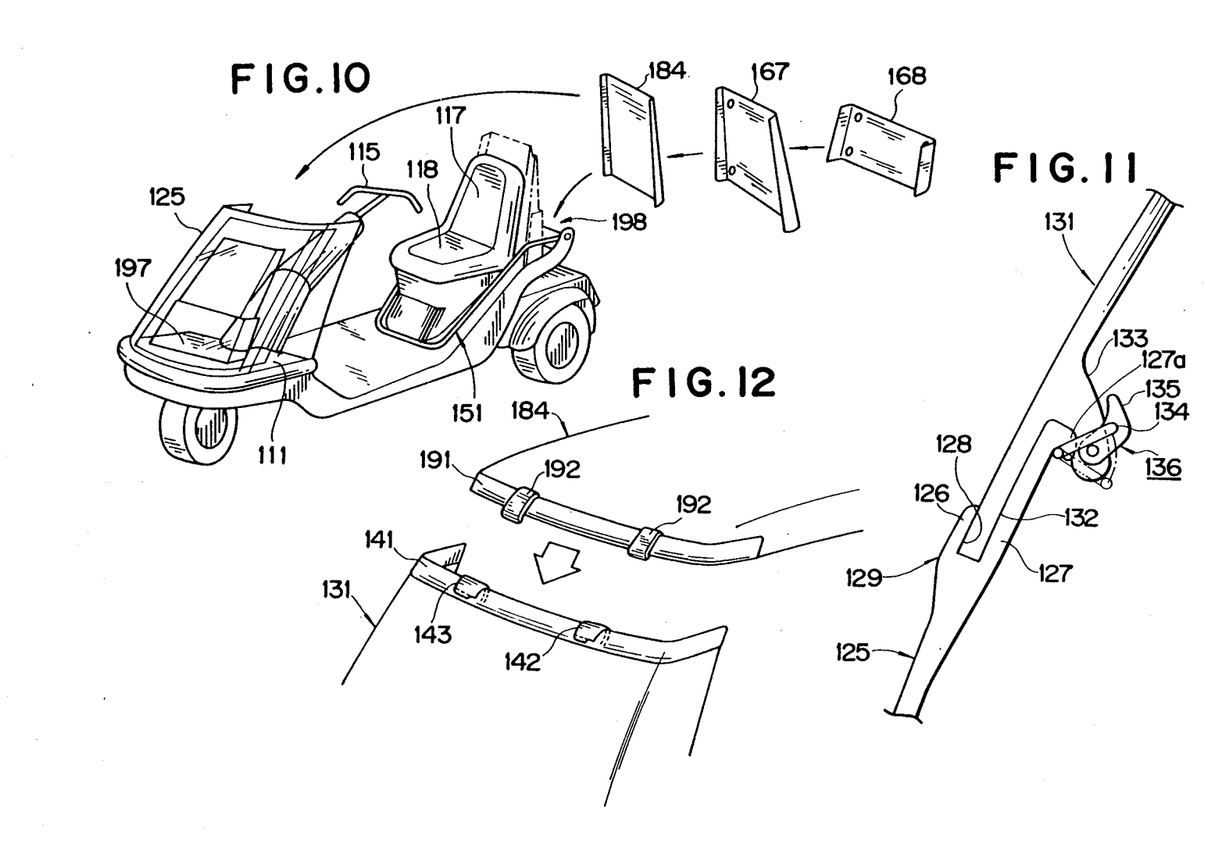
FIG. 10 is a perspective view of the tricycle of FIG. 7, with fittings for making up the cabin disassembled to be accommodated in position.
FIG. 11 is an enlarged side view showing the engagement of essential parts of a front cover and a front wind shield of the tricycle of FIG. 7.
FIG. 12 is an enlarged perspective view showing a locking state between the front wind shield and a roof of the tricycle of FIG. 7.

As shown in FIG. 11, the front cover 125 has a rib portion 129 formed along the upper edge thereof, to provide a front wall 126 and a rear wall 127, defining a slot 128 therebetween. At the upper end of the rear wall 127, in proper positions, there are integrally provided a plurality of hooks 127a rearwardly projecting therefrom. To the rib portion 129, a front wind shield 131 is detachably fitted. The front wind shield 131 has a configuration shaped to be flush and continuous with the front cover 125, when fitted to the rib portion 129 as shown in FIGS. 7 and 8. In this concern, as is in FIG. 11, the front wind shield 131 has its lower end 132 formed fittable into the slot 128, and is integrally provided, on the back thereof near the lower end 132, a plurality of projections 133 rearwardly projecting therefrom at proper positions corresponding to the hooks 127a of the rear wall 127.

Each of the projections 133 is provided with a toggle lock mechanism 136 comprising a ring 134 for engaging and disengaging the projection 133 to and from corresponding one of the hooks 127a and a lever 135 for operating the ring 134. Namely, the fitting of the front wind shield 131 to the front cover 125 as well as the removal therefrom is favorably effectable by fitting the lower end 132 of the front wind shield 131 into the slot 128 and engaging the projection 133 with the hook 127a by use of the toggle lock mechanism 136.

Figures 13, 14, 15:
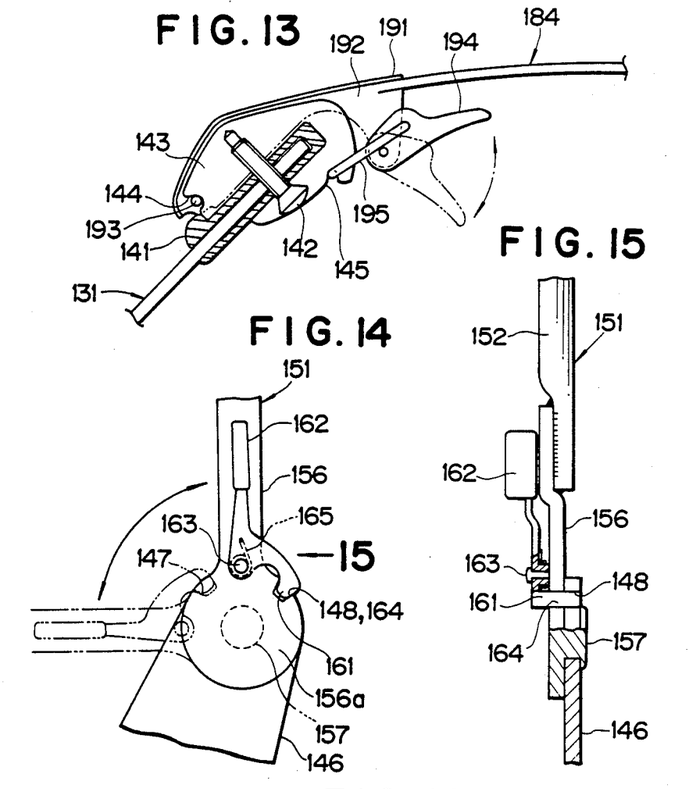
FIG. 13 is a longitudinal sectional view of essential parts of the front wind shield and the roof, as locked, of FIG. 12.
FIG. 14 is an enlarged side view showing a fitted state of a roof stay to a stay support of the tricycle of FIG. 7.
FIG. 15 is a view seen from arrow "15" of FIG. 14.

As shown in FIGS. 12 and 13, along the upper edge of the front wind shield 131, there is fitted a lace 141 on which, at proper positions, a pair of lock pieces 143 are fitted to be secured thereto by either of a pair of screws 142, the lock pieces 143 being each formed at the front lower end with a front locking groove 144 and at the rear lower end with a rear locking groove 145.

On the other hand, at the rear end of a rear cover 123, on both transverse sides thereof, there is provided either of a pair of stay supports 146, 146 upwardly projecting therefrom, the stay supports being each formed, as shown in FIG. 14, at the front side of the upper end with a front groove 147 and at the rear side thereof with a rear groove 148.

Between the upper ends of the stay supports 146, 146, there is provided a roof stay 151 formed like a letter U and arranged swingable between a frontwardly lying position and a vertically standing position. The roof stay 151 is made of a pipe with a relatively small wall thickness and consists of left and right proximal parts 152, 152 pivotally fitted either at the proximal end thereof to the upper ends of the stay supports 146, 146, the proximal parts 152, 152 ascending rearwardly in the standing position of the roof stay 151, left and right bent parts 153, 153, left and right distal parts 154, 154 ascending frontwardly in the standing position of the roof stay 151, and a traversing part 155 interconnecting the distal ends of the left and right distal parts 154, 154. To avoid interfering with the driver's seat 118 and a seat post cover 116, the distances between the respective left and right parts 152 and 152, 153 and 153, and 154 and 154 of the roof stay 151 are dimensioned slightly larger than the maximum corresponding transverse widths of those portions of the tricycle 101 which they will pass alongside when the roof stay 151 is moved between the horizontal position and the vertical position. Accordingly, the traversing part 155 of the roof stay 151 has a length slightly larger than the transverse width of the front end of the seat post cover 116.

At the proximal end of each of the left and right proximal parts 152, 152 of the roof stay 151, as shown in FIG. 15, there is welded a plate-like joint member 156 having a disk portion 156a pivoted at the center thereof by a pin 157 on the corresponding one of the upper ends of the stay supports 146, 146, while each of the upper edges of the stay supports 146, 146 is formed in a semicircle to be flush therealong with the circumference of the disk portion 156a.

Moreover, each of the left and right proximal parts 152, 152 of the roof stay 151 has thereon a grip (not shown) formed by rubber-baking at a proper position for the driver's convenience such as when getting in and out of the tricycle 101 as well as when wheeling it by hands.

Further, as shown in FIGS. 14 and 15, the joint member 156 is provided with a lock lever 162 pivoted thereon by a pin 163 disposed at the neck of the disk portion 156a. The lock lever 162 is integrally provided with a locking pawl 161, while the disk portion 156a has a groove 164 cut in the circumference thereof at a position where the locking pawl 161 will abut on the disk portion 156a when the lock lever 162 is operated in the locking direction. In this connection, the lock lever 162 is normally biassed in the locking direction by a spring 165. Accordingly, when the groove 164 of the disk portion 164 of the joint member 156 is brought in parallel with either of the front and rear grooves 147, 148 of the upper end of each of the stay support 146, the locking pawl 161 will engage therewith to lock the roof stay 151 relative to the stay support 146.

Namely, when the locking pawl 161 is engaged with the groove 164 and the rear groove 148, the roof stay 151 will be locked in the standing position thereof with the traversing part 155 held at a slightly rearward position of the head of a driver as sitting on the driver's seat 118, as shown by the solid line in FIG. 7. When unlocking the roof stay 151 as put in the standing position, the locking pawl 161 is to be disengaged from the grooves 148 and 168 onto the semicircular upper edge of the stay support 146 by operating the lock lever 162. After the disengagement from the grooves 148 and 164, the locking pawl 161 becomes slidable along the upper edge of the stay support 146, following voluntary movements of the roof stay 151. Then, when the locking pawl 161 is engaged with the front groove 147 and the groove 164 by frontwardly bringing down the roof stay 151, as shown by the dotted line in FIG. 7, there will be provided the lying position of the roof stay 151, with the proximal parts 152, 152 put behind the seat back 116, the distal parts 154, 154 alongside of the seat back 117, the driver's seat 118 and the seat post cover 116, and the traversing part 155 in front of the lower end of the seat post cover 116.

In this concern, the roof stay 151 may be resiliently biassed toward the lying position by a spring or the like. Such a modification will permit the roof stay 151 to serve, when luggage 188 is put on foot-rest floor 113, as a holding member for the luggage 188, as shown by the imaginary line in FIG. 7.

Moreover, the roof stay 151 in the lying position is permitted to have the proximal parts 152 thereof, as put rearwardly alongside of the seat back 117, avail as a pair of side bars for a space 198 defined behind the seat back 117.

Figure 9:
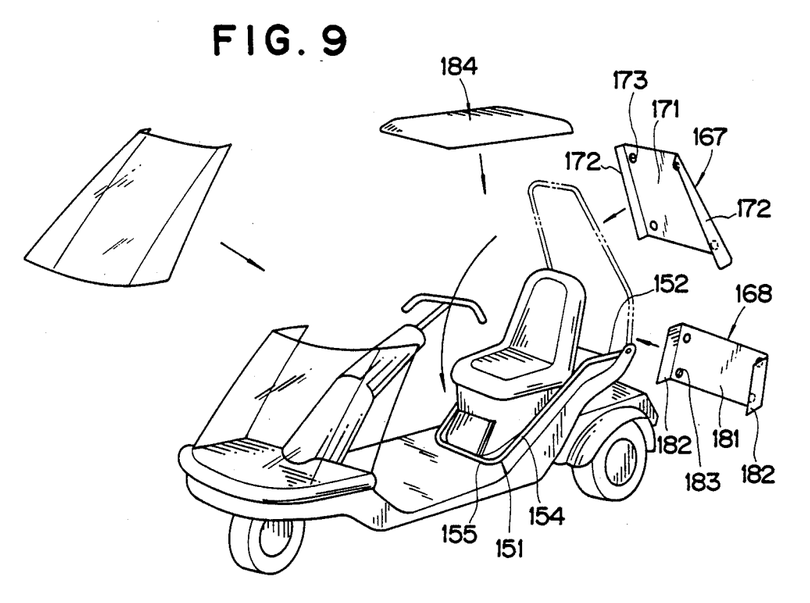
FIG. 9 is a perspective view, as exploded with respect to the driver cabin, of the tricycle of FIG. 7.
Figure 16:
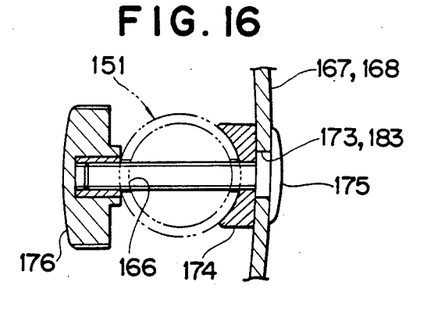
FIG. 16 is an enlarged cross sectional view showing a rear panel and a rear sub-panel, as fitted, of the tricycle of FIG. 7.

In the above arrangement, the roof stay 151 has, at proper positions of the proximal parts 152, 152 and the distal parts 154, 154, a plurality of pairs of opposing bolt fixing holes 166 opened therethrough as shown in FIG. 16, and is provided with a rear panel 167 and a rear sub-panel 168 as shown in FIGS. 8 to 10, which panels 167, 168 are both detachable as described below.

The rear panel 167 consists of a substantially flat trapezoidal part 171 and left and right flanged parts 172, 172 bent frontwardly. The trapezoidal part 167 has near each of the four corners thereof a fixing hole 173 opened therethrough coincidable with corresponding one of the pairs of opposing bolt fixing holes 166 of the distal parts 154, 154 of the roof stay 151. As shown in FIG. 16, the rear panel 167 is detachably fastened to the distal parts 154, 154 of the roof stay 151 by inserting a dressing bolt 175 through the fixing hole 173 and the corresponding pair of bolt fixing holes 166 and applying thereon a dressing nut 176, with a cushion rubber 174 interposed therebetween.

Likewise, the rear sub-panel 168 consists of a substantially flat trapezoidal part 181 and left and right flanged parts 182, 182 bent frontwardly. The trapezoidal part 181 has near each of the four corners thereof a fixing hole 183 opened therethrough coincidable with corresponding one of the pairs of the bolt fixing holes 166 of the proximal parts 152, 152 of the roof stay 151. Like the rear panel 167, the rear sub-panel 168 is detachably fastened, at each fixing hole 183, to the proximal parts 152, 152 by means of a dressing bolt 175, a dressing nut 176 and a cushion rubber 174.

Moreover, the transverse width of the trapezoidal part 171 of the rear panel 167 is predetermined smaller than that of the trapezoidal part 181 of the rear sub-panel 168, so that the rear panel 167 and the rear sub-panel 168, both as removed, can be overlapped by placing the former 167 between the flanged parts 182, 182 of the latter 168.

Further to the above arrangement, as shown in FIGS. 7 to 9, the tricycle 101 is provided with a detachable roof 184 to be stretched between the upper end of the front wind shield 131 as fixed to the front cover 125 and the traversing part 155 of the roof stay 151 as put in the standing position.

The the roof 184 is formed to be smaller in the transverse width than the trapezoidal part 171 of the rear panel 167, so that the roof 184 and the rear panel 167, both as removed, can be overlapped by putting the former 184 between the flanged parts 172, 172 of the latter 167. As a result, the roof 184, the rear panel 167 and the rear sub-panel 168 are enabled to overlap one another in an extremely compact manner.

As shown in FIGS. 12 and 13, like the top lace 141 on the front wind shield 131, a roof lace 191 is fitted to the front end of the roof 184. The roof lace 191 is provided with a pair of lock members 192 disposed at corresponding positions to the lock pieces 143 secured to the top lace 141 of the front wind shield 131. Each of the lock members 192 has a lock pin 193 engageable with the front locking groove 144 of either of the lock pieces 143 and a lock ring 195 engageable with the rear locking groove 145 of the lock piece 143 by operating a clamp lever 194. As will be understood, when desired, the front end of the roof 184 is to be locked on the front wind shield 131 by engaging the lock pin 193 and the lock ring 194 with the front and rear locking grooves 144 and 145, respectively. Moreover, the roof 184 is so configurated that, in the above state, the rear end thereof will cover the traversing part 155 of the roof stay 151 and, particularly when the rear panel 167 is fastened to the distal parts 154, 154 of the roof stay 151, will be held by the upper end of the rear panel 167, while concurrently covering the traversing part 155.

As shown in FIG. 7, with the front wind shield 131, the rear panel 167, the rear sub-panel 168 and the roof 184, the tricycle 101 is permitted to have a driver cabin 196 of which formation and disassembly is possible as circumstances require.

Further, as shown in FIG. 10, between the front cover 125 and the steering handle 115, there is provided above the front floor 111 an accommodating space 197 capable of accommodating the front wind shield 131, the rear panel 167, the rear sub-panel 168 and the roof 184. In this respect, the rear panel 167, the rear sub-panel 168 and the roof 184, which are relatively small in the width, except for the front wind shield 131, may be accommodated by taking the advantage of the rear space 198 provided behind the seat back 117, as shown by the imaginary line in FIG. 10.

According to the second embodiment of the invention, in a light motor vehicle, there are favorably permitted the fixing and removal of a front wind shield and a roof as well as the swinging operation of a roof stay between a lying position thereof and a standing position thereof, to be all readily made by means of various hand levers, in addition to the attachment and detachment of a rear panel and a rear sub-panel to be easily made with dressing bolts and nuts, thus enabling an easy and quick formation of disassembly of a driver cabin. Moreover, by the provision of an accommodating space in the vehicle, there is permitted a favorable accommodation of the front wind shield, the rear panel, the rear sub-panel and the roof, as disassembled.

Referring now to FIGS. 17 to 23, there will be described hereinbelow a modified example of the second embodiment of the invention, in which similar parts will be designated by the same reference characters as the second embodiment, whereas the distinction of the modified example over the second embodiment resides in that the former has a vertically slidable front wind shield remarkably easy of the attachment as well as the detachment.

Figure 17:
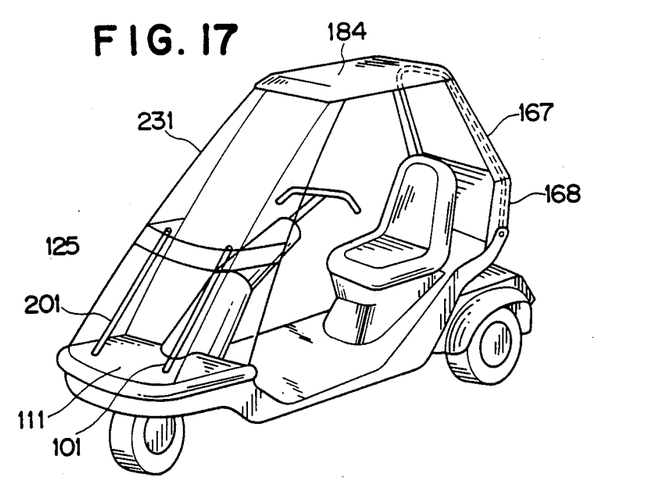
FIG. 17 is a perspective view of a tricycle, with a driver cabin made up, according to a modified example of the second embodiment of the invention.
Figure 18:
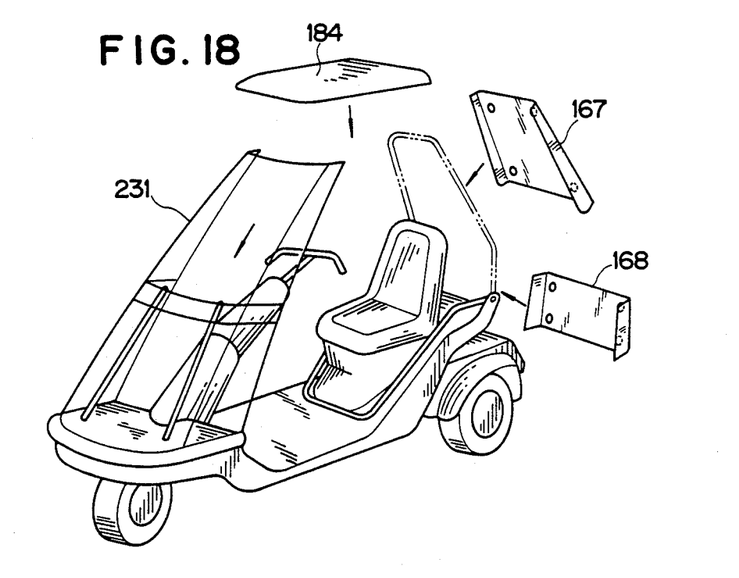
FIG. 18 is a perspective view, as exploded with respect to the driver cabin, of the tricycle of FIG. 17.

In FIG. 17, designated at reference character 125 is a front cover. Behind the front cover 125, there are standing a pair of main pipes 201, 201 either near both side edges of a front floor 111. On the other hand, as shown in FIGS. 20 to 23, at the lower end of a front wind shield 231, there are provided a pair of detachable slide pipes 202, 202 slidably fitted either, through an outer panel 203 and a pair of brackets 204, to the main pipes 201, 201.

Figures 19, 20, 21, 22, 23:
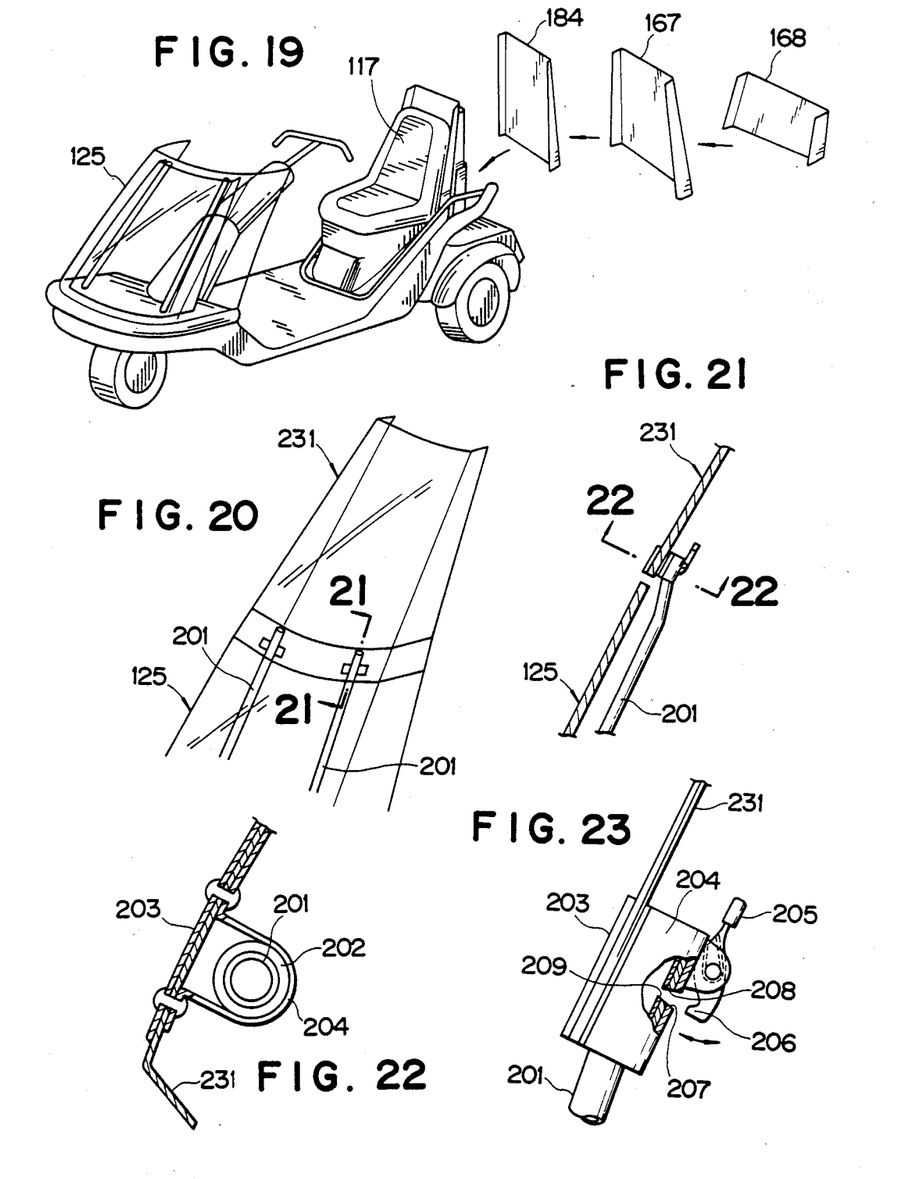
FIG. 19 is a perspective view of the tricycle of FIG. 17, with fittings for making up the cabin disassembled to be accommodated in position.
FIG. 20 is an enlarged side view showing the engagement of essential parts of a front cover and a front wind shield of the tricycle of FIG. 17.
FIG. 21 is a longitudinal sectional view taken along line "21"—"21" of FIG. 20.
FIG. 22 is an enlarged cross sectional view taken along line "22"—"22" of FIG. 21.
FIG. 23 is a side view of the lower end of the front wind shield, partly in section, of FIG. 20.

When a driver's seat is desired to be open to the surrounding atmosphere while running the vehicle, the front wind shield 231 is to be slided downwardly along the main pipes 201 and accommodated behind the front cover 125, and a rear panel 167, a rear sub-panel 168 and a roof 184 are to be accommodated behind a seat back 117. To the contrary, when forming a driver cabin, the front wind shield 231 will be first moved upwardly and, then, as shown in FIG. 23, a pawl part 206 of a lock lever 205 provided for each of the brackets 204 will be brought in engagement with a fitting hole 207 of the bracket 204, a fitting hole 208 of corresponding one of the slide pipes 202 and a fitting hole 209 of corresponding one of the main pipes 201, thereby locking to support the lower end of the front wind shield 231 on the upper end of the main pipe 201, thus fastening the front wind shield 231 to the front cover 125 in a continuous manner. The rear panel 167 and the rear sub-panel 168 as well as the roof 184 will be fixed in the same manner as the second embodiment.

Figure 24:
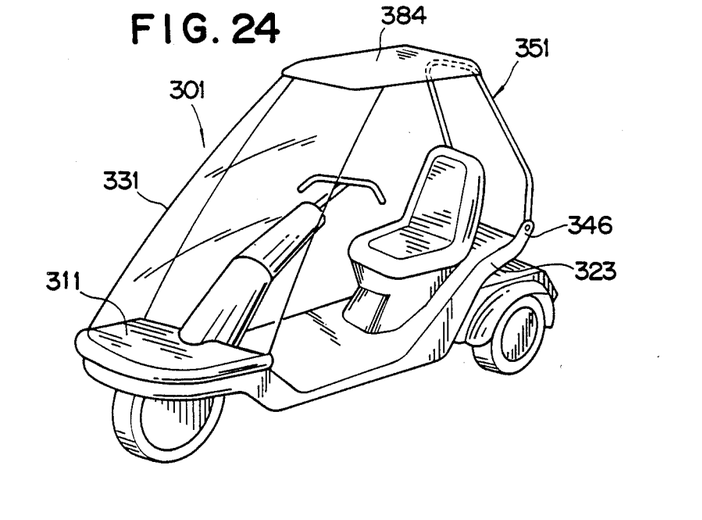
FIG. 24 is a perspective view of a tricycle according to a third embodiment of the invention.

Referring now to FIG. 24 showing a third embodiment of the invention, generally designated at reference character 301 is a tricycle having a front floor 311 formed in the front end thereof. Similarly to the first embodiment, on the front floor 311, there is provided a wind shield 331 standing upwardly from the front edge and both side edges thereof, while slanting rearwardly. On the other hand, like the second embodiment, at the rear end of a rear cover 323, there are provided a pair of stay supports 346 for supporting a roof stay 351 to be swingable between its lying position and standing position. Accordingly, a roof 384 is detachably fixed at the front end to the upper end of the wind shield 331 and at the rear end to the distal end of the roof stay 351.

Figure 25:
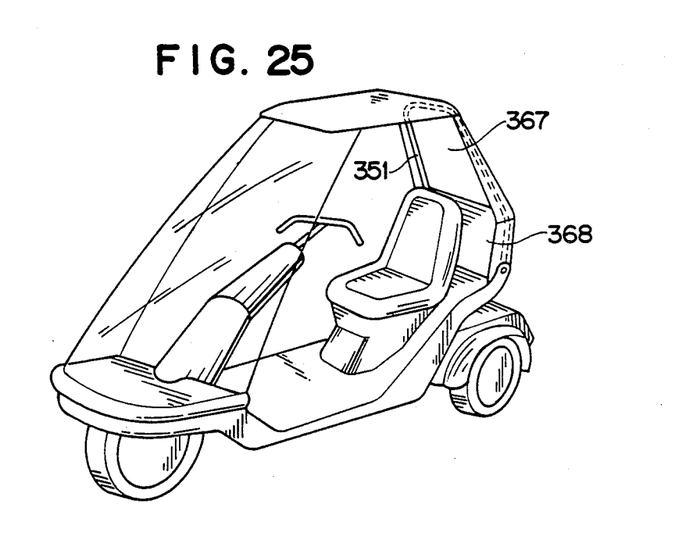
FIG. 25 is a perspective view of a tricycle according to a modified example of the third embodiment of the invention.

Referring now to FIG. 25, there is shown a light motor vehicle similar to that of the third embodiment, while modified in that a roof stay 351 is provided with a rear panel 367 and a rear sub-panel 368, which are both detachable.

Referring now to FIGS. 26 to 29, there will be described hereinbelow a steering shaft structure and a driver's seat structure both favorably applicable to light motor vehicles according to the invention.

Figures 26, 27:
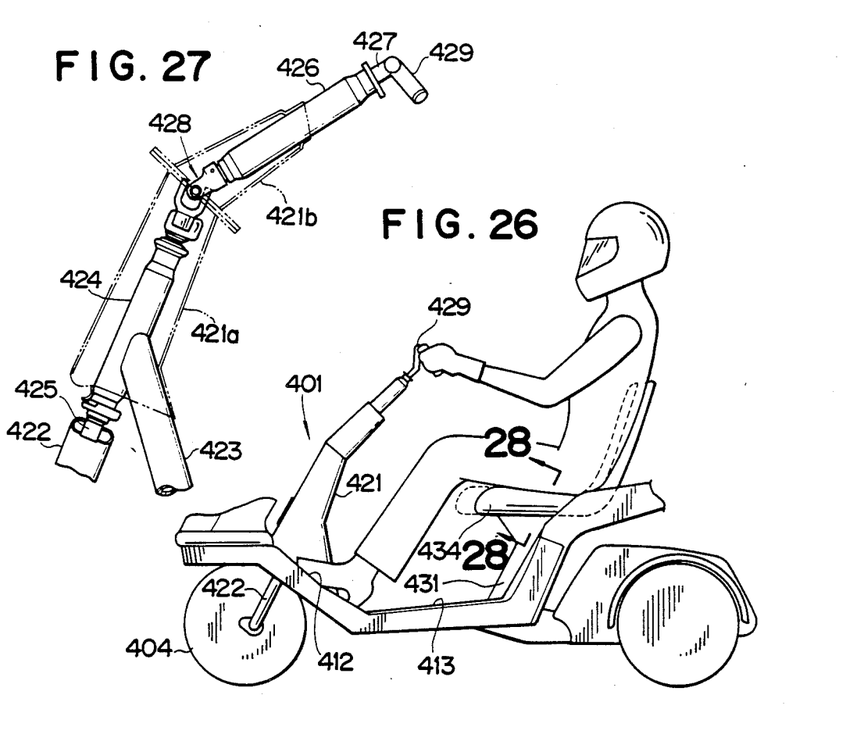
FIG. 26 is a side view of a tricycle having a steering shaft structure and a driver's seat structure both favorably applicable to light motor vehicles according to the invention.
FIG. 27 is an enlarged side view showing the steering shaft structure of FIG. 26.

In FIG. 26, generally designated at reference character 401 is a tricycle. The tricycle 401 has a sloping floor 412 provided with a steering column cover 421 standing thereon, while slanting rearwardly.

As shown in FIG. 27, the steering column cover 421 consists of a lower cover 421a and an upper cover 421b. The lower cover 421a has therein a lower steering shaft 425 supporting a front fork 422 suspending a front road wheel 404, the lower steering shaft 425 being inserted in a lower column 424 secured to a vehicle body framing pipe 423. On the other hand, the upper cover 421b covers the lower half of an upper column 426 through which an upper steering shaft 427 is provided and connected to a handle bar 429. The lower and upper steering shafts 425, 427 are interconnected, at an adjustable angle, by a cross joint 428.

Figures 28, 29:
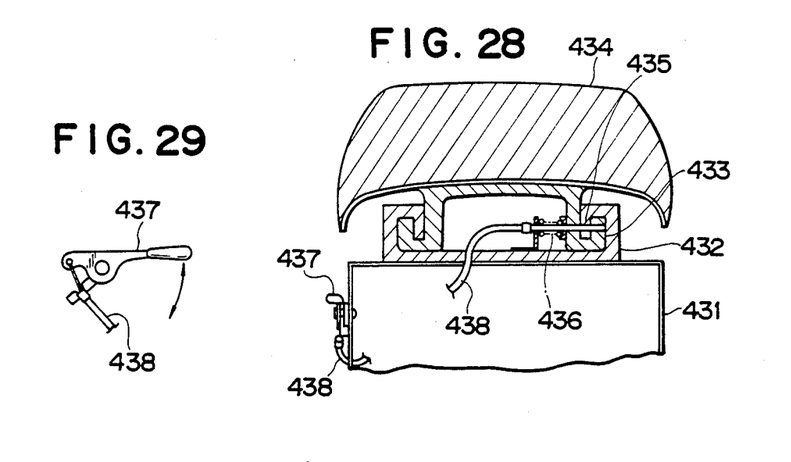
FIG. 28 is an enlarged cross sectional view taken along line "28"—"28" of FIG. 26.
FIG. 29 is an enlarged side view of a seat-sliding control lever of the driver's seat structure of FIG. 26.

The tricycle 401 has, at the rear end of a foot-rest floor 413, a seat post cover 431 standing thereon. As shown in FIG. 28, on the upper surface of the seat post cover 431, there are mounted a guide rail 432 directed in the longitudinal direction of the tricycle 401 and a driver's seat 434 having a slide core 433 downwardly projected therefrom and slidably fitted in the guide rail 432. The guide rail 432 and the slide core 433 are lockable to each other with a lock pin 435 normally biassed in the locking direction thereof by a spring 436, the lock pin 435 thus benig normally piercing both the guide rail 432 and the slide core 433. On either side of the seat post cover 431, there is provided a hand lever 437 connected, as shown in FIG. 29, through a push-pull cable 438 to the lock pin 435. The engagement between the lock pin 435 and the slide core 433 as well as the guide rail 432 is volutarily effectable, thus permitting a favorable adjustment of the driver's seat 434 for the longitudinal position thereof.

As will be understood, with such a steering shaft structure adjustable of the inclination and a driver's seat structure adjustable of the longitudinal position as described above, in a light motor vehicle according to the invention, a driver will be favorably permitted to take a stable optimum position by, for example, lowering the rearward slant of a steering bar and rearwardly sliding a driver's seat, even when the rearward slant of a wind shield is rendered relatively large.

Although there have been described what are at present considered to be the preferred embodiments of the invention, it will be understood that the present invention may be embodied in other specific forms without departing from the spirit or essential characteristics thereof. The present embodiments are therefore to be considered in all respects as illustrative and not restrective. The scope of the invention is indicated by the appended claims rather than by the foregoing description.

We claim:

1. A light motor vehicle, comprising:
a vehicle body;
a driver's seat arranged on said vehicle body;
a wind shield disposed in front of said driver's seat;
a set of fittings for defining a cabin;
said fittings including at least a roof member;
support means for supporting the rear end of said roof member;
said wind shield having an upper end thereof detachably connectable with the front end of said roof member so as to support the front end of said roof member;
said vehicle body being provided with an accommodation space for accommodating said fittings; and
said support means and said roof member being movable between a standing position behind said driver's seat and a lying position below said driver's seat.

2. A vehicle according to claim 1, wherein:
said roof member is provided with a roof frame having a support portion;
said support means comprising a roof stay standing behind said driver's seat and said support portion of said roof frame;
said roof stay has a guide portion in the longitudinal direction thereof;
said roof member is attached to said roof frame and formed engagable at the front end thereof with said upper end of said wind shield; and
said roof frame is connected at the proximal end thereof pivotally to said roof stay and slidable along said guide portion of said roof stay.

3. A vehicle according to claim 2, wherein:
said roof frame is connected at said proximal end thereof to said guid portion of said roof stay so as to be inclinable longitudinally of said vehicle body.

4. A vehicle according to claim 3, wherein:
said accommodation space is defined behind said driver's seat; and
said roof member is accommodatable in said accommodation space when said proximal end of said roof frame is positioned at the lower end of said guide portion of said roof stay.

5. A light motor vehicle, comprising:
a vehicle body;
a driver's seat arranged on said vehicle body;
a wind shield disposed in front of said driver's seat;
a set of fittings for defining a cabin;
said set of fittings including at least a roof member;
support means for supporting the rear end of said roof member;
wind shield having an upper end thereof detachably connected with the front end of said roof member so as to support the front end of said roof member;
said vehicle body being provided with an accommodation space for accomodating said fittings; and
said support means including a roof stay arranged frontwardly inclinable at the proximal end thereof such that said roof member is movable between a standing position thereof behind the driver's seat and a lying position thereof below the said driver's seat.

6. A vehicle according to claim 5, wherein:
said roof stay has a pair of relatively long portions vertically standing and spaced from each other longitudinally of said vehicle body; and
a rear panel is easily attachable to and detachable from between said long portions.

7. A vehicle according to claim 6, wherein:
said rear panel is fastenable to said long portions of said roof stay by fastening means comprising a dressing bolt and a dressing nut.

8. A vehicle according to claim 6, wherein:
said accommodation space is defined behind said driver's seat; and
said roof member and rear panel, as detached, are at least either accommodatable in said accommodation space.

9. A vehicle according to claim 5, wherein:
said roof member, as attached between said upper end of said wind shield and said upper end of said roof stay, is engaged through first engagement means with at least said upper end of said wind shield.

10. A vehicle according to claim 9, wherein:
said wind shield has a front groove and a rear groove both on said upper end of said wind shield, and said first engagement means comprises a pin provided for said roof member and engageable with said front groove, a ring provided for said roof member and engageable with said rear groove, and a lever connected pivotably to said roof member and linked with said ring for engaging and disengaging said ring with and from said rear groove.

11. A vehicle according to claim 9, wherein:
said wind shield is attachable to and detachable from said vehicle body through second engagement means.

12. A vehicle according to claim 11, wherein:
said second engagement means comprises a hook formed on the upper end of a front cover standing on said vehicle body, a ring provided on the lower end of said wind shield and engageable with said hook, and a lever connected pivotably to said wind shield and linked with said ring for engaging and disengaging said ring with and from said hook.

13. A vehicle according to claim 11, wherein:
said second engagement means comprises a pair of pipes upwardly standing at the inner side of a front cover upwardly standing on said vehicle body, said pipes being spaced from each other transversely of said vehicle body, a slidable member provided at said lower end of said wind shield, said slidable member being slidable along either of said pipes, a lock lever provided for either of said pipe and said slidable member, and said lock lever having a pawl penetratable through both thereof as overlapped.

14. A vehicle according to claim 12, wherein:
said front cover has an accommodating space defined at the inner side thereof for accommodating said wind shield.

15. A vehicle according to claim 13, wherein:
said front cover has an accommodating space defined at the inner side thereof for accommodating said wind shield.

* * * * *